US010288042B2

United States Patent
Sanz Corretge et al.

(10) Patent No.: US 10,288,042 B2
(45) Date of Patent: May 14, 2019

(54) WIND TURBINE ROTOR BALANCING METHOD, ASSOCIATED SYSTEM AND WIND TURBINE

(71) Applicant: Acciona Windpower, S.A., Sarriguren (Navarra) (ES)

(72) Inventors: Javier Sanz Corretge, Sarriguren (ES); Unai San Miguel Alzorriz, Sarriguren (ES); Fernando Echeverria Dura, Sarriguren (ES); Alvaro Gorostidi Martinez de Lecea, Sarriguren (ES); Teresa Arlaban Gabeiras, Sarriguren (ES); Jose Miguel Garcia Sayes, Sarriguren (ES); Miguel Nunez Polo, Sarriguren (ES)

(73) Assignee: ACCIONA WINDPOWER, S.A., Sarriguren (Navarra) (ES)

( * ) Notice: Subject to any disclaimer, the term of this patent is extended or adjusted under 35 U.S.C. 154(b) by 83 days.

(21) Appl. No.: 15/472,644

(22) Filed: Mar. 29, 2017

(65) Prior Publication Data

US 2017/0284373 A1 Oct. 5, 2017

(30) Foreign Application Priority Data

Mar. 31, 2016 (EP) .................... 16382144

(51) Int. Cl.
*G01M 1/04* (2006.01)
*F03D 13/35* (2016.01)
(Continued)

(52) U.S. Cl.
CPC ............ *F03D 13/35* (2016.05); *B64C 27/008* (2013.01); *F05B 2240/2211* (2013.01);
(Continued)

(58) Field of Classification Search
CPC ...................................................... G01M 1/04
(Continued)

(56) References Cited

U.S. PATENT DOCUMENTS

| 2,362,842 A * | 11/1944 | Mueller | ............... G01M 1/28 324/90 |
| 3,906,801 A * | 9/1975 | Butler | ............... G01M 1/28 73/457 |

(Continued)

FOREIGN PATENT DOCUMENTS

| DE | 102008023109 A1 | 3/2009 |
| EP | 1580543 A2 | 9/2005 |

(Continued)

OTHER PUBLICATIONS

Egedal, Per, Method for Balancing Rotor Mounted on a Hub of a Wind Turbine, WO2011032606 A1 (Siemens AG [DE], et al), Mar. 24, 2011, 24 pgs.*

(Continued)

*Primary Examiner* — Clayton E Laballe
*Assistant Examiner* — Kevin Butler
(74) *Attorney, Agent, or Firm* — Hayes Soloway PC

(57) ABSTRACT

The present invention relates to a wind turbine rotor balancing method which compensates imbalances between the centers of gravity of the wind turbine blades, in both magnitude and position along said blades, so that the amount of mass needed to carry out this balancing method is minimized, while reducing the loads and vibrations associated with a position of the center of gravity of the rotor not aligned with the axis of rotation thereof, wherein the invention further relates to the wind turbine rotor balancing system and the wind turbine balanced with the above method.

20 Claims, 2 Drawing Sheets

(51) Int. Cl.
  *G01M 1/28* (2006.01)
  *B64C 27/00* (2006.01)
  *G01M 1/12* (2006.01)
  *G01M 1/22* (2006.01)

(52) U.S. Cl.
  CPC ........... *F05B 2260/83* (2013.01); *G01M 1/04* (2013.01); *G01M 1/12* (2013.01); *G01M 1/22* (2013.01); *G01M 1/28* (2013.01); *Y02E 10/72* (2013.01)

(58) Field of Classification Search
  USPC ..................................................... 73/455
  See application file for complete search history.

(56) References Cited

U.S. PATENT DOCUMENTS

| | | | | |
|---|---|---|---|---|
| 4,078,422 | A * | 3/1978 | Brunsch | B64C 27/008 416/224 |
| 4,112,774 | A * | 9/1978 | Chadwick | G01M 1/22 73/147 |
| 4,220,055 | A * | 9/1980 | Dubois | F01D 5/027 464/180 |
| 4,513,619 | A * | 4/1985 | Widdall | G01M 1/22 73/455 |
| 4,879,792 | A * | 11/1989 | O'Connor | F01D 5/027 29/889 |
| 5,011,374 | A * | 4/1991 | Miller | F01D 5/027 416/144 |
| 5,018,943 | A * | 5/1991 | Corsmeier | F01D 5/027 416/144 |
| 5,140,856 | A * | 8/1992 | Larsen | G01M 1/28 416/144 |
| 5,219,454 | A * | 6/1993 | Class | F16F 15/34 416/144 |
| 5,463,900 | A * | 11/1995 | Schierling | F16F 15/32 73/460 |
| 5,537,861 | A * | 7/1996 | Seitelman | F16F 15/32 700/279 |
| 6,582,196 | B1 * | 6/2003 | Andersen | F03D 1/0608 415/4.3 |
| 7,517,198 | B2 * | 4/2009 | Baker | F03D 1/0675 416/227 R |
| 7,654,138 | B2 * | 2/2010 | Thelen | F01D 5/027 73/460 |
| 7,954,376 | B2 * | 6/2011 | Angantyr | H02K 15/165 73/458 |
| 7,957,851 | B2 * | 6/2011 | Braswell | F01D 5/027 416/219 R |
| 7,993,103 | B2 * | 8/2011 | Cairo | F03D 1/0658 29/889 |
| 8,066,486 | B2 * | 11/2011 | Christensen | G01H 1/06 290/44 |
| 8,206,110 | B2 * | 6/2012 | Vettese | F03D 1/065 29/889.7 |
| 8,261,599 | B2 * | 9/2012 | Jeffrey | F03D 13/35 415/1 |
| 8,291,764 | B2 * | 10/2012 | Lenz | G01M 1/16 700/279 |
| 9,216,821 | B1 * | 12/2015 | Holemans | G06F 17/50 |
| 9,970,415 | B2 * | 5/2018 | Agarwal | F03D 7/045 |
| 2007/0294049 | A1 * | 12/2007 | Pierce | F03D 7/0224 702/151 |
| 2009/0266160 | A1 * | 10/2009 | Jeffrey | G01H 1/006 73/455 |
| 2011/0036166 | A1 * | 2/2011 | Lenz | G01M 1/16 73/455 |
| 2012/0134813 | A1 * | 5/2012 | Nies | F03D 7/022 416/1 |
| 2012/0134825 | A1 * | 5/2012 | Grabau | F03D 7/0228 416/144 |
| 2012/0183399 | A1 * | 7/2012 | Perkinson | F03D 7/0224 416/1 |
| 2012/0200699 | A1 * | 8/2012 | Bunge | F03D 1/0675 348/142 |
| 2013/0173224 | A1 * | 7/2013 | Santerre | B64C 27/008 703/1 |
| 2015/0355044 | A1 * | 12/2015 | Cardinal | G01M 1/22 73/455 |
| 2017/0284373 | A1 * | 10/2017 | Sanz Corretge | F03D 13/35 |

FOREIGN PATENT DOCUMENTS

| | | | | |
|---|---|---|---|---|
| EP | 1978246 | A1 | 10/2008 | |
| EP | 2233904 | * | 6/2012 | ............. G01M 1/12 |
| EP | 2233904 | B1 | 6/2012 | |
| ES | 2376815 | | 3/2012 | |
| ES | 2376815 | A1 * | 3/2017 | ........... B64C 27/008 |
| WO | 2009129617 | A1 | 10/2009 | |
| WO | 2011032606 | A1 | 3/2011 | |

OTHER PUBLICATIONS

Written Opinion, PCT/EP2009/062192, Siemens Aktiengesellschaft, Jun. 25, 2009, 6 pgs.*

Search Report, PCT/EP2009/062192, Siemens Aktiengesellschaft, Jun. 25, 2009, 4 pgs.*

Becker, Edwin et al.; "Reducing vibration by balancing rotor blades." English translation of Erneuerbare Energien; Aug. 2009; Pruftechnik Condition Monitoring GmbH.

* cited by examiner

WIND TURBINE ROTOR BALANCING METHOD, ASSOCIATED SYSTEM AND WIND TURBINE

OBJECT OF THE INVENTION

The present invention relates to a wind turbine rotor balancing method which compensates the imbalances between the centres of gravity of the turbine blades, both in magnitude and position along said blades, so that the amount of mass needed to carry out this balancing method is minimized, while reducing the loads and vibrations associated with a position of the centre of gravity of the rotor not aligned with the axis of rotation thereof.

The invention further relates to the wind turbine rotor balancing system and to the wind turbine balanced with the above method.

BACKGROUND OF THE INVENTION

To prevent undesirable loads for which the wind turbine is not designed, its components must be manufactured according to maximum dimensional and mass tolerances, among others.

One of the most critical components in this regard are the rotor blades since deviations in their nominal weight and static moment relative to the rotor axis can introduce high loads and vibrations in the wind turbine. These must not only be manufactured individually according to a maximum weight tolerance, the tolerance usually given as a percentage of the nominal weight, but some conditions need to be verified in the relationship between the values taken by parameters of the two blades for two-bladed rotors, or the three blades in the case of three-bladed rotors, forming the rotor.

These parameters are:
maximum difference in weight between the blades;
static moment of rotor imbalance with respect to the rotor axis.

Corrections often have to be made on the weight of the blades to achieve that not only individually, but also the pairs and trios of blades of a wind turbine rotor fall within the established tolerances. To this end balancing chambers are commonly arranged inside the blades, designed to accommodate the amount of material necessary to achieve this depending on the magnitude of the above parameters.

Not performing adequate correction of dispersions in mass between the blades to achieve a proper balance of the rotors and that the resultant static moment from all of them over the rotor shaft is zero, may have important implications in terms of loads and vibrations in wind turbines on which they are mounted. Sometimes these implications involve costly on-site actions, once the blades have been installed on the wind turbine, and to mitigate them it is necessary to implement methods to balance the rotors on site such as that described in the U.S. Pat. No. 5,140,856 A or the document "*Reducing vibration by balancing rotor blades*". Erneuerbare Energien August 2009. Prüftechnik.

Factory balancing methods are also implemented. Specifically, the measuring and/or characterization step of weight and/or static moment of the blades is performed. Some methods for characterizing the static moment of the blades are described in patents EP2233904B1 and U.S. Pat. No. 4,078,422.

A valid approximation to consider that a rotor is balanced is when the vectorial sum of static moments of the blades relative to the rotor axis is zero. It is generally considered that a rotor meets the specifications if the resultant static imbalance is below a threshold value taken into account when calculating the loads and design of the wind turbine.

If these specifications are not met by the blades as manufactured, the rotors must be balanced, this being achieved generally by placing masses at certain points of the blades a posteriori.

However, even applying the above methods and considering that the resultant static imbalance is below the threshold value, it is possible that the blades may present or be under certain intrinsic or extrinsic conditions, which greatly increase stresses in the wind turbine, leading to considerable decreases in the fatigue life of its components.

The consequence of this is that wind turbines whose rotors have a resultant static imbalance which is admissible at the discretion of the threshold value, undergo however increased vibrations caused by the mass distribution of the blades, which results in longitudinal accelerations which are damaging to the wind turbine nacelle.

The known wind turbine control methods implement protection algorithms to prevent such vibration levels from exceeding a certain threshold and they proceed to stop the operation of the wind turbine when they detect dangerous levels.

On the other hand, certain weather events associated with low temperatures can cause ice to adhere in an imbalanced manner between the blades of the wind turbine, contributing to aggravate the existing imbalance. In situations in which stresses are increased in the wind turbine due to vibrations, it is possible that the protection algorithms may stop the wind turbine much sooner than they would if there was not already a noxious imbalance.

The wind turbine rotor balancing method of the present invention overcomes all the above drawbacks allowing not only to reduce vibrations and loads on the wind turbine but also the number of stops associated with rotor imbalances, which will help to reduce production losses associated with stops after detecting excessive vibration, while increasing the life of the wind turbine.

DESCRIPTION OF THE INVENTION

The present invention relates to a wind turbine rotor balancing method which compensates the imbalances between the centres of gravity of the blades, both in magnitude and position along said blades, so that the amount of mass needed to perform said balancing method is minimized, while reducing the loads and vibrations associated with a position of the centre of gravity of the rotor not aligned with the axis of rotation thereof.

The wind turbine rotor balancing method, the wind turbine comprising a rotor which comprises at least two blades, comprises the following steps:
a step of identifying an angular reference position for each of the at least two blades;
a step of calculating a magnitude of rotor imbalance depending on a mass of each of the at least two blades relative to a rotor centre;
a step of calculating a phase of rotor imbalance; and
a balancing step, wherein the balancing step is performed at least if the phase of rotor imbalance lies outside a permissible angular range relative to the reference angular positions.

Optionally, the method comprises, prior to the step of calculating a magnitude of rotor imbalance, a step of weighing each of the at least two blades to determine the mass of each one which is carried out by at least two weighing points, preferably a first weighing point in the vicinity of a root of the blade and a second weighing point in the vicinity of a tip of the blade.

Optionally, the magnitude of rotor imbalance calculated in the step of calculating a magnitude of rotor imbalance is the resultant mass moment from the mass moments of each of the at least two blades relative to the centre of the rotor.

Preferably, the balancing step is performed at least if the phase of rotor imbalance lies outside a range of ±45° relative to the reference angular positions, more preferably ±30°, and more preferably ±25°.

More specifically, if the phase of rotor imbalance is in antiphase with the reference angular position of one of the blades, it has been found that the loads in the downstream of the rotor increase considerably. This demonstrates the importance of the effect of the phase of rotor imbalance when determining the rotor imbalance. That is why, in order to consider that the rotor is balanced, the sought position of the phase of rotor imbalance should be around one of the reference angular positions for each of the blades since, otherwise, when the rotor rotates, the position of such loads varies over one turn and causes these loads to fluctuate, which reduces the fatigue life of the wind turbine components.

Optionally, the balancing step is carried out if, in addition to the phase of rotor imbalance lying outside a permissible angular range relative to the reference angular position for each of the at least two blades, at least one of the following conditions is fulfilled:
  the difference between the masses of the at least two blades, difference calculated taking the blades two by two, is above a first threshold value,
  the magnitude of rotor imbalance is above a second threshold value.

Optionally, the balancing step is performed by placing at least one balancing mass in at least one of the at least two blades.

Thus, the wind turbine rotor balancing method of the present invention compensates, between the wind turbine blades, imbalances in the centre of gravity thereof, both in magnitude and position along said blades, so the amount of mass needed to carry out this balancing process is minimized, while reducing the loads and vibrations associated with a position of the centre of gravity of the rotor not aligned with the axis of rotation thereof.

The invention also relates to a wind turbine rotor balancing system, the wind turbine comprising a set of components including a rotor which comprises at least two blades, the system comprising:
  means for identifying a reference angular position for each of the at least two blades;
  first means for calculating a magnitude of rotor imbalance depending on a mass of each of the at least two blades relative to a rotor centre;
  second means for calculating a phase of rotor imbalance; and
  balancing means, wherein said balancing means are configured to act at least if the phase of rotor imbalance lies outside a permissible angular range relative to the reference angular positions.

Optionally, the balancing means are configured to act, if in addition to the phase of rotor imbalance lying outside a permissible angular range relative to the reference angular positions, at least one of the following conditions is met:
  the difference between the masses of the at least two blades, difference calculated taking the blades two by two, is above a first threshold value,
  the magnitude of rotor imbalance is above a second threshold value.

Optionally, the balancing means are configured to place at least one balancing mass in at least one of the at least two blades.

Optionally, the wind turbine rotor balancing system comprises means for weighing each of the at least two blades to determine the mass of each one, wherein the weighing means for each of the at least two blades to determine the mass of each one comprise at least two weighing points, preferably a first weighing point placeable in the vicinity of the root of the blade and a second weighing point placeable in the vicinity of the tip of the blade.

The invention also relates to a wind turbine balanced by the wind turbine rotor balancing method described above, comprising a rotor which comprises at least two blades, wherein each blade comprises a mass, and wherein the rotor comprises a calculable magnitude of rotor imbalance and a calculable phase of rotor imbalance, wherein the phase of rotor imbalance is within an permissible angular range relative to at least one longitudinal direction of one of the at least two blades.

Optionally, the magnitude of rotor imbalance is calculated based on the mass of each of the at least two blades relative to a rotor centre.

Optionally, the difference between the masses of the at least two blades, difference calculated taking the blades two by two, is above a first threshold value.

Optionally, the magnitude of rotor imbalance is above a second threshold value.

Optionally, at least one of the at least two blades comprises at least one balancing mass.

PREFERRED EMBODIMENT OF THE INVENTION

Figure 1:
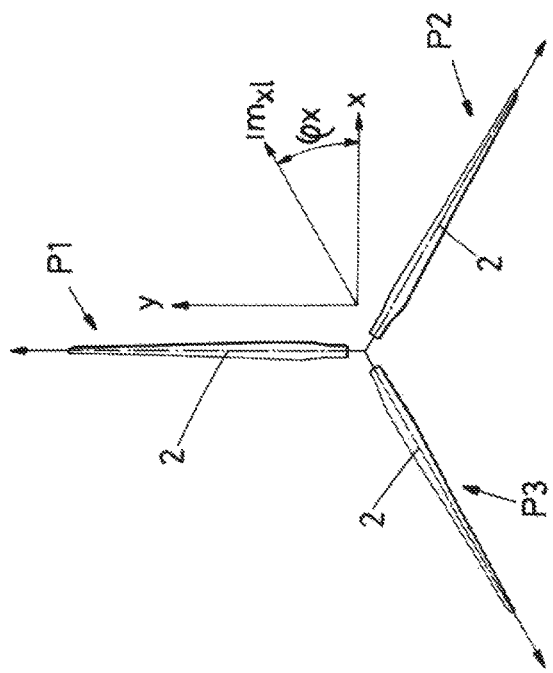
FIG. 1 shows a diagram of the step of identification of each of the three blades of the wind turbine rotor balancing method of the present invention according to the first preferred embodiment.
Figure 2:
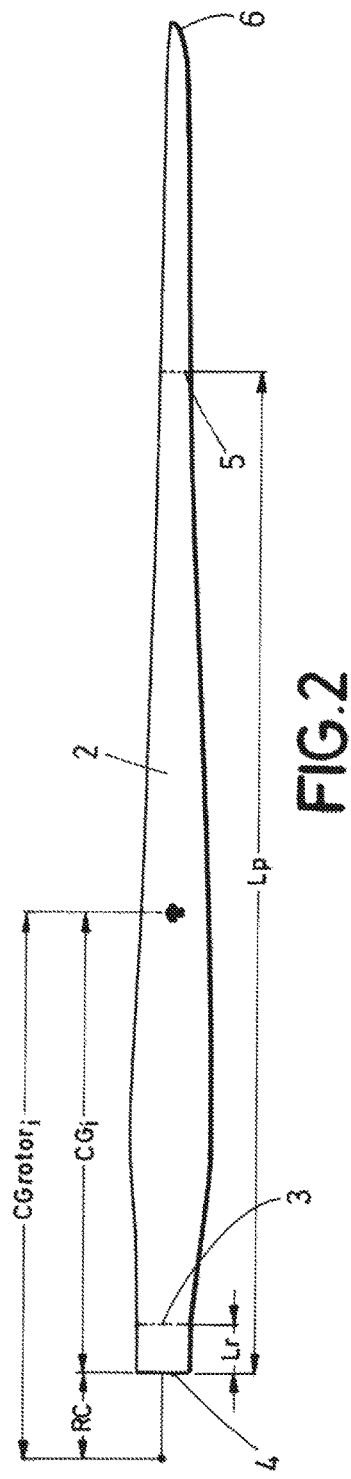
FIG. 2 shows a diagram of the step of weighing of each three blades of the first embodiment to determine the mass of each one of the wind turbine rotor balancing method of the present invention.

In a first preferred embodiment of the invention, the wind turbine rotor balancing method, the wind turbine comprising a rotor (1) which comprises three blades (2) arranged on a hub (8), comprises the following steps:
  a step of identifying a reference angular position for each of the three blades (2), said reference angular positions for each of the blades being spaced 120° from each other, as shown in FIG. 1, the blades being referenced as P1, P2 and P3;
  a step of weighing each of the three blades (2) to determine the mass of each one (2);
  a step of calculating a magnitude of rotor imbalance, which in this preferred embodiment is the resultant mass moment ($m_x$) from the mass moments of each of the three blades (2) with respect to a centre (7) of the rotor (1);
  a step of calculating a phase of rotor imbalance (1); and a balancing step, wherein the balancing step is performed at least if the phase of rotor imbalance (1) lies outside a permissible angular range relative to the reference angular positions.

In this embodiment, the step of identifying a reference angular position for each of the three blades (2), comprises the following substeps:

- a substep of enumeration of each of the blades (2), for example with numbers 1, 2 and 3.
- a substep of labelling of each of the blades (2) with a number corresponding to the preceding enumeration substep.

In this embodiment, the step of weighing each of the three blades (2) to determine the mass of each one (2) is carried out through two weighing points, preferably a first weighing point (3) in the vicinity of a root (4) of the blade (2) whereby a root mass value ($M_{ir}$) is obtained and a second weighing point (5) in the vicinity of a tip (6) of the blade (2) whereby a tip mass value ($M_{ip}$) is obtained, so that the total mass of each of the blades (2) is calculated as:

$$M_{iT}=M_{ir}+M_{ip} \text{ wherein } i=1,2,3$$

In this embodiment, the step of calculating a magnitude of rotor imbalance, said magnitude of rotor imbalance being the resultant mass moment ($m_x$) from the mass moments of each of the three blades (2) relative to the centre (7) of the rotor (1), comprises:

A substep of calculating the centre of gravity of each blade (2) relative to the root (4) of each blade (2) according to the following:

$$CG_i = \frac{L_r M_{ir} + L_p M_{ip}}{M_{iT}} \text{ wherein } i = 1, 2, 3$$

wherein $L_r$ is the distance between the first weighing point (3) and the root (4) of the blade (2) and $L_P$ is the distance between the second weighing point (5) and the root (4) of the blade (2), and a substep of calculating the centre of gravity of each blade (2) relative to the centre (7) of the rotor (1) according to the following:

$$(CG_{rotor})_i = \frac{(RC+L_r)M_{ir} + (RC+L_p)M_{ip}}{M_{iT}} = RC + CG_i \text{ wherein } i = 1, 2, 3$$

wherein RC is the radius of the hub (8), and wherein the resultant mass moment ($m_x$) from the mass moments of each of the three blades (2) relative to the centre (7) of the rotor (1) is calculated as:

$$m_x = \sqrt{\left\{M_{1T}(CG_{rotor})_1 - \frac{M_{2T}(CG_{rotor})_2 + M_{3T}(CG_{rotor})_3}{2}\right\}^2 + \left\{\frac{\sqrt{3}}{2}(M_{2T}(CG_{rotor})_2 - M_{3T}(CG_{rotor})_3)\right\}^2}$$

In this embodiment, the step of calculating a phase ($\varphi_x$) of rotor imbalance is calculated as:

$$\varphi_x = \operatorname{atan}\left[\frac{M_{1T}(CG_{rotor})_1 - \frac{M_{2T}(CG_{rotor})_2 + M_{3T}(CG_{rotor})_3}{2}}{\frac{\sqrt{3}}{2}(M_{2T}(CG_{rotor})_2 - M_{3T}(CG_{rotor})_3)}\right]$$

In this embodiment, the permissible angular range relative to the reference angular positions of the balancing step, is one of the following:

$$65° \leq \varphi_x \leq 115°$$

$$185° \leq \varphi_x \leq 235°$$

$$305° \leq \varphi_x \leq 355°,$$

the reference angular positions being 90°, 210° and 330° respectively.

In a second embodiment, the balancing step is carried out, if in addition to the phase of rotor imbalance lying outside a permissible angular range relative to the reference angular positions, at least the following is fulfilled:
the difference between the masses of the three blades (2), difference calculated taking the blades (2) two by two, is above a first threshold value with respect to a nominal mass ($M_n$) of the blades (2), wherein the first threshold value is less than 2%, i.e.

$$\frac{|M_{iT} - M_{jT}|}{M_n} \cdot 100 < 2\% \; \forall_{i,j} \text{ being } i \neq j$$

Figure 3:
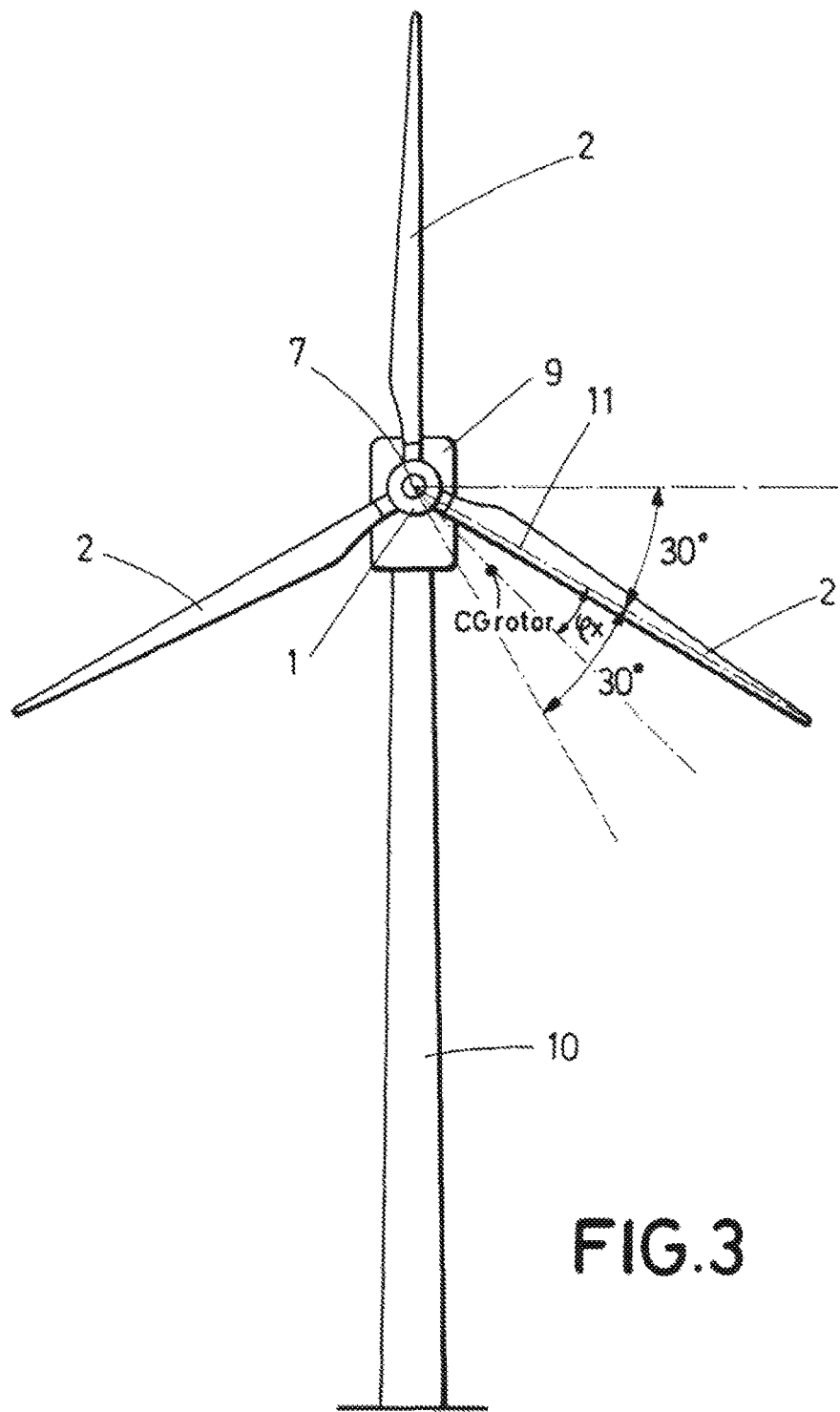
FIG. 3 shows a wind turbine balanced by the wind turbine rotor balancing method of the first embodiment of the present invention.

In a third embodiment, the allowable angular range relative to the reference angular positions is ±45°, preferably ±30°. That is, the permissible angular range is 90° centred on the reference positions, with 45° in both directions around the reference positions, preferably, the permissible angular range is 60° centred on the reference positions, with 30° in both directions around the reference positions. FIG. 3 shows a wind turbine balanced by the wind turbine rotor balancing method according to this third embodiment, wherein the permissible angular range relative to the reference angular positions is ±30°.

The wind turbine rotor balancing system can implement the method described in the first and second examples of preferred embodiment, while the wind turbine balanced by the wind turbine rotor balancing method described in the first and second embodiments, comprises a set of components including a rotor (1) which comprises three blades (2) wherein the blades (2) are spaced 120° from each other and each of the blades (2) comprises a mass defined as $M_{iT}=M_{ir}+M_{ip}$ wherein i=1, 2, 3 wherein the rotor (1) comprises:

a magnitude of rotor imbalance calculated based on the mass of each of the three blades (2) relative to the centre (7) of the rotor (1), said magnitude of rotor imbalance being the resultant mass moment ($m_x$) from the mass moments of each of the three blades (2) relative to the centre (7) of the rotor (1) according to the expression $$m_x = \sqrt{\left\{M_{1T}(CG_{rotor})_1 - \frac{M_{2T}(CG_{rotor})_2 + M_{3T}(CG_{rotor})_3}{2}\right\}^2 + \left\{\frac{\sqrt{3}}{2}(M_{2T}(CG_{rotor})_2 - M_{3T}(CG_{rotor})_3)\right\}^2}$$

and
a phase ($\varphi_x$) of rotor imbalance according to the expression $$\varphi_x = \operatorname{atan}\left[\frac{M_{1T}(CG_{rotor})_1 - \frac{M_{2T}(CG_{rotor})_2 + M_{3T}(CG_{rotor})_3}{2}}{\frac{\sqrt{3}}{2}(M_{2T}(CG_{rotor})_2 - M_{3T}(CG_{rotor})_3)}\right]$$

wherein the phase ($\varphi_x$) of rotor imbalance is within a permissible angular range with respect to at least one longitudinal direction (11) of one of the three blades (2), said permissible angular range being ±45°, more preferably ±30°, and more preferably ±25°.

Additionally, the difference between the masses of the three blades (2), difference calculated taking the blades (2) two by two, is above a first threshold value, wherein the first threshold relative to a nominal mass ($M_n$) of the blades (2) it is less than 2%, i.e.

$$\frac{|M_{iT} - M_{jT}|}{M_n} \cdot 100 < 2\% \; \forall_{i,j \text{ being } i \neq j}$$

The wind turbine further comprises a nacelle (9) and a tower (10).

The invention claimed is:

1. A wind turbine rotor balancing method, the wind turbine comprising a rotor which comprises at least two blades, the method comprising the following steps:
   a step of identifying a reference angular position for each of the at least two blades;
   a step of calculating a magnitude, $m_x$, of rotor imbalance based on a mass, $M_{iT}$, of each of the at least two blades with respect to a centre of the rotor;
   a step of calculating a phase, $\varphi_x$, of rotor imbalance; and
   a balancing step performed by balancing means configured to act on at least one of the at least two blades, wherein the balancing step is carried out at least if the phase, $\varphi_x$, of rotor imbalance lies outside a permissible angular range relative to the reference angular positions.

2. The method of claim 1 wherein the balancing step is carried out if at least one of the following conditions is additionally met:
   the difference between the masses of the at least two blades, difference calculated taking the blades two by two, $|M_{iT} - M_{jT}| \; \forall_{i,j \text{ being } i \neq j}$, is above a first threshold value;
   the magnitude of rotor imbalance, $m_x$, is above a second threshold value.

3. The method of claim 1 wherein the balancing step is performed by placing at least one balancing mass in at least one of the at least two blades.

4. The method of claim 1 comprising, prior to the step of calculating a magnitude, $m_x$, of rotor imbalance, a step of weighing each of the at least two blades to determine the mass of each one wherein the weighing step is carried out through at least two weighing points, preferably a first weighing point in the vicinity of a root of the blade and a second weighing point in the vicinity of a tip of the blade.

5. The method of claim 1 wherein the magnitude of rotor imbalance calculated in the step of calculating a magnitude of rotor imbalance is the resultant mass moment from the mass moments of each of the three blades relative to the centre of the rotor.

6. The method of claim 1 wherein the rotor comprises three blades, so that the step of identifying a reference angular position for each of the three blades is carried out with said reference angular positions for each of the blades being spaced 120° from each other.

7. The method of claim 4 wherein the step of weighing each of the at least two blades to determine the mass of each one is carried out through at least two weighing points, preferably a first weighing point in the vicinity of a root of the blade with which a root mass value, $M_{ir}$, is obtained, and a second weighing point in the vicinity of a tip of the blade with which a tip mass value, $M_{ip}$, is obtained so that the total mass of each of the blades is calculated as:

$$M_{iT} = M_{ir} + M_{ip}.$$

8. The method of claim 7 wherein the step of calculating a magnitude of rotor imbalance, said magnitude of rotor imbalance being the resultant mass moment from the mass moments of each of the three blades with respect to the centre of the rotor, comprises:
   a substep of calculating the centre of gravity of each blade relative to the root of each blade according to the following:

$$CG_i = \frac{L_r M_{ir} + L_p M_{ip}}{M_{iT}} \text{ wherein } i = 1, 2, 3$$

wherein $L_r$ is the distance between the first weighing point and the root of the blade and $L_p$ is the distance between the second weighing point and the root of the blade, and
   a substep of calculating the centre of gravity of each blade relative to the centre of the rotor according to the following:

$$(CG_{rotor})_i = \frac{(RC + L_r)M_{ir} + (RC + L_p)M_{ip}}{M_{iT}} = RC + CG_i \text{ wherein } i = 1, 2, 3$$

wherein RC is the radius of the hub, and
wherein the resultant mass moment from the mass moments of each of the three blades relative to the centre of the rotor is calculated as:

$$m_x = \sqrt{\left\{M_{1T}(CG_{rotor})_1 - \frac{M_{2T}(CG_{rotor})_2 + M_{3T}(CG_{rotor})_3}{2}\right\}^2 + \left\{\frac{\sqrt{3}}{2}(M_{2T}(CG_{rotor})_2 - M_{3T}(CG_{rotor})_3)\right\}^2}.$$

9. The method of claim 8 wherein the step of calculating a phase, $\varphi_x$, of rotor imbalance is calculated as:

$$\varphi_x = \operatorname{atan}\left[\frac{M_{1T}(CG_{rotor})_1 - \frac{M_{2T}(CG_{rotor})_2 + M_{3T}(CG_{rotor})_3}{2}}{\frac{\sqrt{3}}{2}(M_{2T}(CG_{rotor})_2 - M_{3T}(CG_{rotor})_3)}\right].$$

10. The Method according of claim 1 wherein the permissible angular range relative to the reference angular positions is ±45°, preferably ±30°.

11. A wind turbine rotor balancing system, the wind turbine comprising a set of components including a rotor which comprises at least two blades, wherein the system comprises:
   means for identifying a reference angular position for each of the at least two blades;
   first means for calculating a magnitude, $m_x$, of rotor imbalance based on a mass, $M_{iT}$, of each of the at least two blades with respect to a centre of the rotor;
   second means for calculating a phase, $\varphi_x$, of rotor imbalance; and
   balancing means configured to act on at least one of the at least two blades of the wind turbine, wherein said balancing means are configured to act at least if the phase, $\varphi_x$, of rotor imbalance lies outside a permissible angular range relative to the reference angular positions.

12. The system of claim 11 wherein the balancing means are configured to act, if at least one of the following conditions is met:
   the difference between the masses of the three blades, difference calculated taking the blades two by two, $|M_{iT}-M_{jT}| \, \forall_{i,j \, being \, i \neq j}$ is above a first threshold value,
   the magnitude, $m_x$, of rotor imbalance is above a second threshold value.

13. The system of claim 11 wherein the balancing means are configured to place at least one balancing mass on at least one of the at least two blades.

14. The system of claim 11 further comprising weighing means for each of the three blades to determine the mass of each one, the weighing means comprise at least two weighing points, preferably a first weighing point placeable in the vicinity of the root of the blade and a second weighing point placeable in the vicinity of the tip of the blade.

15. A wind turbine balanced by a balancing method comprising the following steps:
   a step of identifying a reference angular position for each of the at least two blades;
   a step of calculating a magnitude, $m_x$, of rotor imbalance based on a mass, $M_{iT}$, of each of the at least two blades with respect to a centre of the rotor;
   a step of calculating a phase, $\varphi_x$, of rotor imbalance; and
   a balancing step performed by balancing means configured to act on at least one of the at least two blades, wherein the balancing step is carried out at least if the phase, $\varphi_x$, of rotor imbalance lies outside a permissible angular range relative to the reference angular positions;
   wherein the wind turbine comprises a rotor which comprises the at least two blades, wherein each of the at least two blades comprises the mass, $M_{iT}$, wherein the rotor comprises the calculable magnitude, $m_x$, of rotor imbalance and phase, $\varphi_x$, of rotor imbalance, wherein the phase, $\varphi_x$, of rotor imbalance is within the permissible angular range relative to at least one longitudinal direction of one of the at least two blades.

16. The wind turbine of claim 15 wherein the difference between the masses of the at least two blades, difference calculated taking the blades two by two, $|M_{iT}-M_{jT}| \, \forall_{i,j \, being \, i \neq j}$ is above a first threshold value.

17. The wind turbine of claim 15 wherein the magnitude, $m_x$, of rotor imbalance is above a second threshold value.

18. The wind turbine of claim 15 wherein at least one of the at least two blades comprises at least one balancing mass.

19. The system of claim 12 wherein the balancing means are configured to place at least one balancing mass on at least one of the at least two blades.

20. The wind turbine of claim 16 wherein the magnitude, $m_x$, of rotor imbalance is above a second threshold value.

* * * * *